(12) United States Patent
Jordan et al.

(10) Patent No.: US 9,952,246 B2
(45) Date of Patent: Apr. 24, 2018

(54) DETERMINATION OF GYROSCOPIC BASED ROTATION

(71) Applicant: VERIFI LLC, West Chester, OH (US)

(72) Inventors: Richard K. Jordan, Littleton, MA (US); Yan Glina, Medford, MA (US); Mark F. Roberts, North Andover, MA (US); Eric P. Koehler, Boston, MA (US)

(73) Assignee: Verifi LLC, West Chester, OH (US)

( * ) Notice: Subject to any disclaimer, the term of this patent is extended or adjusted under 35 U.S.C. 154(b) by 624 days.

(21) Appl. No.: 14/541,858

(22) Filed: Nov. 14, 2014

(65) Prior Publication Data

US 2015/0142362 A1    May 21, 2015

Related U.S. Application Data

(60) Provisional application No. 61/904,680, filed on Nov. 15, 2013.

(51) Int. Cl.
| | |
|---|---|
| *G01P 3/44* | (2006.01) |
| *B01F 15/00* | (2006.01) |
| *B28C 7/02* | (2006.01) |
| *B28C 5/42* | (2006.01) |
| *G01C 19/02* | (2006.01) |
| *B01F 9/06* | (2006.01) |
| *G01C 19/00* | (2013.01) |
| *G01C 25/00* | (2006.01) |
| *B01F 9/00* | (2006.01) |

(52) U.S. Cl.
CPC .................. *G01P 3/44* (2013.01); *B01F 9/06* (2013.01); *B01F 15/00201* (2013.01); *B01F 15/00363* (2013.01); *B28C 5/422* (2013.01); *B28C 7/02* (2013.01); *G01C 19/00* (2013.01); *G01C 19/02* (2013.01); *G01C 25/005* (2013.01); *G01P 9/02* (2013.01); *B01F 2009/0063* (2013.01)

(58) Field of Classification Search
CPC ...... G01P 3/44; G01P 9/02; B01F 9/06; B01F 15/00201; B01F 15/00363; B01F 2009/0063; G01C 19/00; G01C 19/02; G01C 25/005; B28C 5/422; B28C 7/02
See application file for complete search history.

(56) References Cited

U.S. PATENT DOCUMENTS

| | | |
|---|---|---|
| 5,752,768 A | 5/1998 | Assh |
| 8,020,431 B2 | 9/2011 | Cooley et al. |

(Continued)

FOREIGN PATENT DOCUMENTS

| | | |
|---|---|---|
| DE | 20 2010 012841 U1 | 12/2010 |
| EP | 2 827 169 A1 | 1/2015 |

(Continued)

*Primary Examiner* — Peter Bradford
(74) *Attorney, Agent, or Firm* — Baker & Hostetler LLP

(57) ABSTRACT

A gyroscopic rotational monitoring system may be utilized for monitoring one or more properties of rotatable container or vessel, and/or one or more properties of a displaceable material contained in the rotatable vessels. An exemplary aspect relates to the use of a gyroscope and periodicity sensor (e.g., accelerometer) to determine rotational speed of a concrete mixing drum, so that the slump or other property of the concrete can be monitored or adjusted such as by dosing with water, chemical admixtures, or mixture thereof.

17 Claims, 10 Drawing Sheets

(56) References Cited

U.S. PATENT DOCUMENTS

| | | | |
|---|---|---|---|
| 8,118,473 B2 | 2/2012 | Compton et al. | |
| 8,491,717 B2 | 7/2013 | Koehler et al. | |
| 2008/0022790 A1* | 1/2008 | Lee | G01C 19/42 74/5.4 |
| 2009/0037026 A1 | 2/2009 | Sostaric et al. | |
| 2009/0292495 A1* | 11/2009 | Navarro, Jr. | G01C 19/42 702/92 |
| 2011/0035097 A1* | 2/2011 | Lewis | A61G 5/045 701/36 |
| 2011/0126647 A1* | 6/2011 | Newland | G01C 19/42 74/5.6 R |
| 2011/0313703 A1 | 12/2011 | Petillon | |
| 2012/0016523 A1 | 1/2012 | Koehler et al. | |
| 2016/0114867 A1* | 4/2016 | Nicol | B63B 39/14 701/21 |

FOREIGN PATENT DOCUMENTS

| | | |
|---|---|---|
| WO | WO 2012/024393 A1 | 2/2012 |
| WO | WO 2013/150183 A1 | 10/2013 |

* cited by examiner

DETERMINATION OF GYROSCOPIC BASED ROTATION

CROSS-REFERENCE

This application claims the benefit under 35 U.S.C. § 119(e) of Provisional U.S. Patent Application No. 61/904,680, filed on Nov. 15, 2013, and entitled "GYROSCOPIC ROTATIONAL MONITORING SYSTEM," the content of which is incorporated by reference herein in its entirety.

TECHNICAL FIELD

The present disclosure relates to manufacture and processing of hydratable cementitious compositions such as concrete, or other materials unrelated to cementitious compositions, and more particularly to a delivery system and method for monitoring one or more properties of a concrete, mortar, or other material contained in a rotating container.

BACKGROUND

Automated systems are used for mixing all types of materials, such as concrete mixes contained in ready-mix delivery trucks. Such automated systems measure the energy required for mixing a concrete load contained in a rotatable mixing drum thereby to ensure that "slump" values of the concrete (the term "slump" refers to the workability of a concrete mixture) during transport or at delivery are within a desired range. Such automated systems increase the reliability and consistency of the concrete during transportation and delivery by controlling the duration and rate of rotation of the mixing drum.

Once proper mixing of the concrete components is completed, it is important to maintain a minimum mixing drum speed to prevent segregation of components. This ensures even consistency as well as satisfactory strength in the concrete. On the other hand, it is important to avoid excessive drum speeds that would make the concrete overly stiff due to acceleration or advancement of the setting process, or due to deleterious breaking of air cells leading to release of entrained air from the concrete. Thus, automated slump monitoring systems require accurate measurement of the mixing drum speed.

In U.S. Pat. No. 5,752,768 to Assh, an automated mobile mixer system is described, which relies upon magnetic markers on the rotating mixing drum and magnetic detection sensors to measure the speed and direction of the drum. The drum speed is determined by measuring the time interval between the circumferentially spaced markers as they pass by the electro-magnetic sensors which are mounted on a non-rotating portion of the vehicle. (See e.g., US '768 at col. 9, line 62; col. 11, line 55; and FIGS. 1 and 3).

The use of magnetic markers introduces inaccuracies for concrete monitoring systems. Current systems often employ approximately a dozen magnetic markers mounted circumferentially around the drum axis, as not every concrete mixer truck has bolt heads on the drum surface which can be configured for this purpose. In many cases, magnetic markers need to be attached using an adhesive to the outer drum surface. Further, where a sensor or marker is incorrectly placed or becomes dislodged or misaligned by a tree branch, washing brush, concrete material, or other objects, inaccuracies can be introduced into the sensing and measurement operations of the slump monitoring system.

For example, circumferential misalignment or uneven spacing between magnets, or an imbalance of individual magnet strengths among the markers, can introduce variations in speed readings perceived by the concrete slump monitoring system. For example, if magnets or sensors are weak, or the distance between them increases, it becomes difficult to detect the period peaks in the signal generated by the electro-magnetic sensors, and accuracy is lost. A missing magnet can have an even more severe impact on drum speed monitoring.

In U.S. Pat. No. 8,118,473 and WO 2012/024393 A1 to Compton et al. (both owned by the common assignee hereof), magnetic sensing, as well as wireless accelerometers mounted on the concrete mixing drum, are disclosed for measuring drum speed. In addition to using magnetic sensors, one could also measure "ticks of the speed sensor built into the motor (used for rotating the drum)" or could detect signals generated by "an auxiliary processor coupled to a wireless accelerometer" mounted on the mixing drum. (US '473 at col. 21, line 65).

However, while a wireless accelerometer mounted on the concrete drum might be sufficient for speed measurement when the delivery truck is parked or otherwise stationary, large errors can be introduced when the truck is in motion. Inaccuracies can be introduced, for example, when the truck is accelerating, braking, turning hard, or travelling on non-level roads or irregular terrain.

Concrete mixing drums, as seen on ready-mix delivery trucks on the roads today, are not pure cylinders that rotate in a purely parallel or perpendicular direction with respect to the ground. Rather, such mixing drums have an irregular pear-like shape, with angled inner walls upon which are mounted two or more blades spirally-oriented around the drum rotational axis, which is slanted 10-20 degrees with respect to horizontal ground; and the concrete is pushed (downwards at a slant) towards a more bulbous end when the drum is rotated in one direction; or otherwise discharged (upwards at a slant) towards and through the drum opening located at the other (less bulbous) end when the drum is rotated in the opposite direction.

SUMMARY

As described herein, a gyroscope may be utilized in determining rotational speed of a structure, such as a rotating vessel, a container of displaceable materials or fluids, or the like.

The present disclosure discloses a device comprising a rotatable container or vessel having a wall for containing a displaceable material; a gyroscope which provides an output signal in response to the rotating state of the container or vessel, the gyroscope being connected, electrically or wirelessly, to a processor unit programmed for determining rotational speed of the container or vessel in response to the gyroscope output signal.

The terms "container" and "vessel" are used herein to refer to objects that can contain displaceable materials, and includes drums or other enclosures. The term "displaceable materials" includes powders, particles (e.g., dry or in slurry, paste, or suspension), grains and seeds, cereals, coffee, detergents, pharmaceutical materials, concrete, and the like.

In an exemplary configuration, the present disclosure provides a concrete monitoring system wherein a gyroscope is employed for determining rotational speed of a concrete mixing drum, and wherein an accelerometer (or other timing device) is optionally used for the purpose of calibrating and maintaining the accuracy of the gyroscope. Enhanced accuracy in the monitoring of the mixing drum speed in turn enhances the performance of automated systems used for monitoring concrete that is transported in ready-mix delivery trucks.

Gyroscopic-based rotation determination, as described herein, may, for example, be suited for accurately measuring the rotational speed of containers or vessels that are subject to changes in tilt angles or other irregularities and variations in the environment that could otherwise affect accuracy of speed measurement. The use of a gyroscope with an optional accelerometer may be useful for monitoring rotational speed of various kinds of containers or vessels, such as, for example, food mixing machines, and washer and dryer units for clothes and fabrics, or the like, wherein the load is displaced (moved around) by rotational movement of the drum or vessel, and the displaced load contained within the drum itself can create unbalance to the rotational axis, moment, or angular disposition of the drum or vessel; and a processing unit can be programmed in response to the signals generated by the gyroscope to adjust or to correct the unbalanced condition by altering energy being fed to the motor which drives rotation of the drum or vessel.

The use of a gyroscope may be advantageous in situations wherein it may be desirable to monitor rotational speed numerous times within a single rotation of the container or vessel.

In an exemplary configuration, the present disclosure provides a wireless gyroscope/accelerometer device that can be installed in each wheel-and-tire assembly on a passenger car, racing car, truck, or other vehicle which uses tires containing air or other materials, and by using an onboard or remote computer processor programmed to monitor speed at various points within single tire rotations, it can be determined whether a particular wheel/tire assembly on the car requires dynamic balancing and/or re-alignment, and a signal or diagnosis can be displayed on a handheld or dashboard device or other form of on-board monitoring system.

As another example, a wireless gyroscope/accelerometer assembly can be mounted on the outer belly of concrete mixing drums to monitor rotational drum speed at a frequency greater than the number of magnetic markers that could otherwise be attached to the outer mixing drum.

In the racing car and concrete truck examples, to name a few, the use of an accelerometer can be used to calibrate the gyroscope, which is susceptible to drift due to temperature and other environmental factors.

Thus, an exemplary gyroscopic monitoring system of the present disclosure for measuring a rotational rate of a rotatable vessel configured to contain a displaceable material comprises: a gyroscope for connection to the rotatable vessel during operation of the rotatable vessel, the gyroscope providing an output signal corresponding to an angular velocity of the rotatable vessel; at least one periodicity sensor for connection to the rotatable vessel during operation of the rotatable vessel, the at least one periodicity sensor providing an output signal corresponding to a period of rotation of the rotatable vessel; a processor configured to receive the output signal from the gyroscope and the output signal from the at least one periodicity sensor, and further configured to provide: an output signal corresponding to the rotational rate of the rotatable vessel; and calibration information based on the output signal from the gyroscope and the output signal from the at least one periodicity sensor.

In an aspect of the disclosure, the gyroscope is a microelectro-mechanical system. In another aspect, the at least one periodicity sensor is an accelerometer. The gyroscope and accelerometer may be coupled to the processor as well as to battery or power pack and wireless transmitter for mounting on a concrete mixing drum or other rotating vessel containing a displaceable material.

In still further exemplary configurations, the present disclosure provides a rotatable concrete mixing vessel having a monitoring system for measuring the rotational rate of the rotatable concrete mixing vessel, comprising: a gyroscope for connection to the rotatable vessel during operation of the rotatable vessel, the gyroscope providing an output signal corresponding to an angular velocity of the rotatable vessel; at least one periodicity sensor for connection to the rotatable vessel during operation of the rotatable vessel, the at least one periodicity sensor providing an output signal corresponding to a period of rotation of the rotatable vessel; a processor configured to receive the output signal from the gyroscope and the output signal from the at least one periodicity sensor, and further configured to provide: an output signal corresponding to the rotational rate of the rotatable vessel; and calibration information based on the output signal from the gyroscope and the output signal from the at least one periodicity sensor.

In still further exemplary configurations which include a slump monitoring system, the slump monitoring system comprises: a second processor, the second processor configured to receive the output signal corresponding to the rotational rate provided by the processor; and an energy sensor operably connected to the second processor, the energy sensor measuring the energy required to rotate the rotatable vessel.

Further advantages and features of the present disclosure are described in further detail hereinafter.

BRIEF DESCRIPTION OF THE DRAWINGS

An appreciation of the benefits and features of the present disclosure may be more readily comprehended by considering the following written description of different aspects in conjunction with the drawings, wherein.

DETAILED DESCRIPTION

The present disclosure now will be described more fully hereinafter with reference to the accompanying drawings, in which various exemplary configurations are shown illustrating variations within the scope of the disclosure. This disclosure may, however, be embodied in many different forms and should not be construed as limited to the configurations set forth herein; rather, these configurations are provided so that this disclosure will be thorough and complete, and will fully convey the scope of the disclosure to those of ordinary skill in the art.

Figure 1:
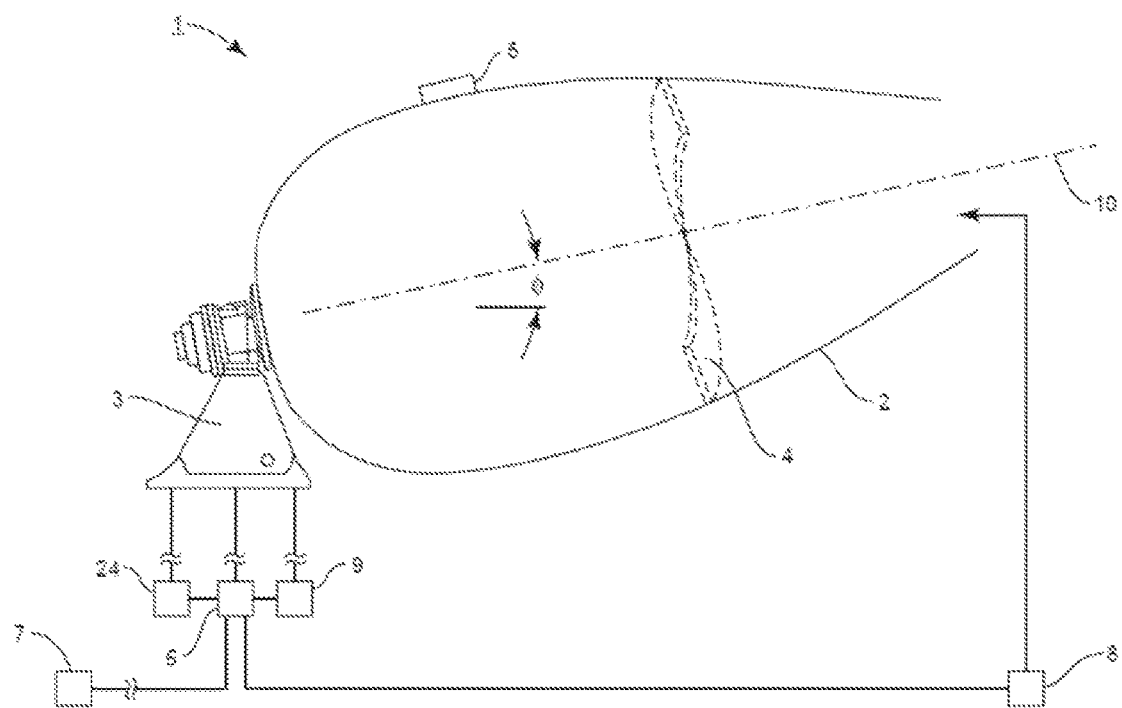
FIG. 1 is a diagrammatic illustration of an example rotational monitoring unit mounted on a rotatable concrete mixing drum of a delivery truck and used in combination with (or alternatively, as part of an automated slump monitoring system).

FIG. 1 is an illustration of an example mixing system 1 comprising a rotatable drum 2 drivable by a motor (e.g., hydraulic pressure or electric drive) 3. In concrete mixing systems for example, such as the systems used on concrete ready-mix delivery trucks, during standard operation, the drive 3 and drum 2 may be configured to cause the drum 2 to rotate in a first direction, causing the contents of the drum to be mixed, or in a second direction opposite the first direction, with spirally-mounted blades 4 or paddles causing the contents of the drum to discharge out of the mixing drum 2. The term "standard operation," as used herein, refers to operation of the rotatable vessel, such as the drum 2, when the vessel is being used for its regularly intended purpose, such as mixing and delivering concrete, versus other operational uses, such as a calibration mode that may be utilized to calibrate the gyroscope on the rotatable vessel prior to standard operation or, as another example, during intervals wherein the truck is stationary.

An exemplary mixing system 1 may comprise a rotational monitoring unit 5, such as a gyroscopic rotational measuring device, for example, to measure the rotation of the drum 2. In a further exemplary configuration, the rotational monitoring unit 5 may be mounted directly onto the drum 2. The unit 5 may also be mounted, such as by adhering or fastening, in or on a rotatable vessel or container at a location which is not coincidental with its rotational axis 10. The drum 2 may be mounted an any appropriate angle, Φ, as depicted in FIG. 1. In an example configuration, the unit 5 may be mounted at a distance from its rotational axis 10; wherein greater accuracy may be provided by larger distances from the rotational axis 10 of the rotatable drum 2. As the drum 2 is driven by the motor 3, the drum rotates about the rotational axis 10, which may be offset by an angle φ relative to the ground, and the monitoring unit 5 measures the angular velocity of the drum 2. The rotation of the drum 2 about axis 10 may be uniform, for example, about the geometric centerline of the drum 2. The monitoring unit 5 is configured to provide an output signal corresponding to the measured angular velocity.

As further illustrated in FIG. 1, an exemplary concrete monitoring system of the disclosure may comprise one or more processor units 6 which may be electrically or wirelessly connected to receive signals from the motor or hydraulic pressure drive 3 as well as to control the speed of the motor/drive 3. The processor unit 6 may be electrically or electronically connected to one or more memory locations 7, which may be used for storing program applications for monitoring and controlling the motor or hydraulic pressure drive 3 (thereby adjusting the speed of rotation of the drum 2), and the processor unit 6 is electrically connected or electronically connected to one or more dispensing systems 8 for administering water, chemical admixtures, or both into a concrete mix contained in the mixing drum 2. In an example configuration, the processor unit 6 may be coupled to the memory location(s) 7, and memory location(s) 7 may comprise a processor-readable medium storage medium (also referred to as a computer-readable storage medium, machine-readable storage medium, etc.) comprising executable instructions that when executed by processor unit 6, may cause processor unit 6 to effectuate operations for gyroscopic-based rotation determination as described herein.

As is to be understood, a storage medium (e.g., a computer-readable storage medium, a machine-readable storage medium, a processor-readable storage, etc.) has a concrete, tangible, physical structure. As is known, a signal does not have a concrete, tangible, physical structure. The one or more memory locations 7, as well as any storage medium described herein, is not to be construed as a signal. The one or more memory locations 7, as well as any storage medium described herein, is not to be construed as a transient signal. Further, the one or more memory locations 7, as well as any storage medium described herein, is not to be construed as a propagating signal. The one or more memory locations 7, as well as any storage medium described herein, is to be construed as an article of manufacture having a concrete, tangible, physical structure.

Concrete monitoring systems involving measurements of the energy (e.g., hydraulic pressure) required to rotate the mixing drum, using a concrete monitoring processor 6, and adjusting the concrete mix by administering water and/or chemical admixtures, are commercially available from Verifi, LLC, of Ohio and Cambridge Mass. Automated concrete monitoring systems are variously disclosed in patent literature, some of which was authored by Verifi LLC, including U.S. Pat. No. 8,118,473 to Compton et al.; U.S. Pat. No. 8,020,431 to Cooley et al.; U.S. Pat. No. 8,491,717 to Koehler et al.; U.S. Ser. No. 10/599,130 to Cooley et al. (Publ. No. US 2007/70185636 A1); U.S. Ser. No. 11/834,002 to Sostaric et al. (Publ. No. US 2009/0037026 A1); and U.S. Ser. No. 258,103 to Koehler et al. (Publ. No. 2012/0016523 A1).

For example, in U.S. Pat. No. 8,491,717 of Koehler et al. the monitoring system can track dosages of polycarboxylate ether cement dispersants and air control agents (air entraining and/or detraining agents) based on nominal dosage profiles which are stored in memory.

Figure 2A:
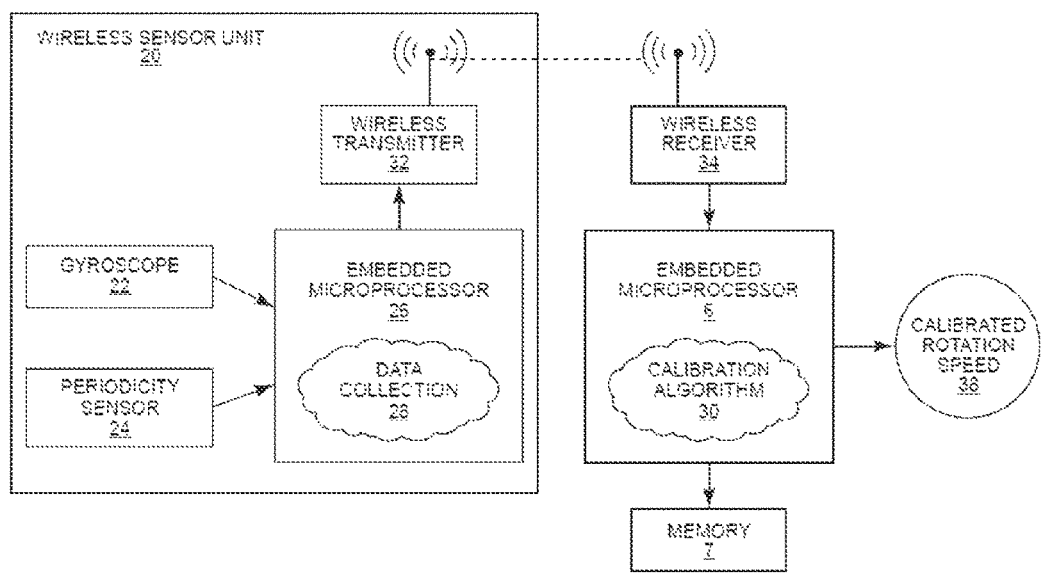
FIG. 2A is a schematic depiction of an exemplary gyroscopic rotational measuring device of the present disclosure.
Figure 2B:
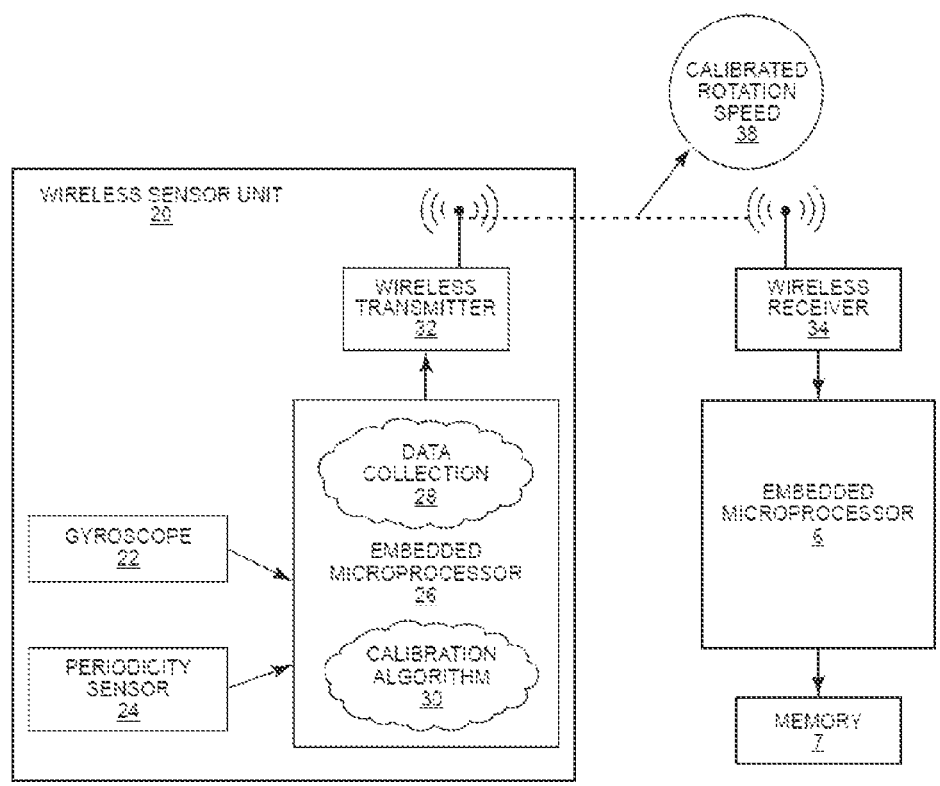
FIG. 2B is a schematic depiction of another example gyroscopic rotational measuring device.

As generally illustrated in FIG. 1 and more specifically illustrated in FIGS. 2A and 2B, a rotational monitoring unit 5 may be configured to provide an output signal corresponding to a calibrated angular velocity. A wireless transmitter may transmit signals to one or more processor units 6, which may also receive signals from the energy sensor 9 which monitors energy (e.g., hydraulic) required to rotate a vessel, such as, for example, a mixing drum containing a load of concrete. The processor unit 6 may be programmed to monitor slump and/or other properties of the concrete load, and/or to adjust slump and/or other properties of the concrete by administering a liquid, such as, for example, water, chemical admixture, or both into the concrete. The processor unit 6 may be programmed to transmit the data corresponding to the various electrical inputs to another computer processor located at a remote location. Chemical admixtures may be added to concrete for purposes of modifying any number of properties, including, by way of example, reducing the need for water (e.g., plasticizing, increasing workability), controlling the setting of concrete (e.g., set accelerating, set retarding), managing air content and quality (e.g., air entrainers, air detrainers), shrinkage reduction, corrosion inhibition, and other properties.

Greater details of the monitoring unit of FIG. 1 and the monitoring system are provided with reference to FIG. 2A, which includes a schematic depiction of a configuration of a rotational monitoring unit 5 including a gyroscope 22. In this particular configuration, the rotational monitoring unit 5 may be a wireless sensor unit 20. The wireless sensor unit 20 may comprise a gyroscope 22, a periodicity sensor 24, an embedded microprocessor 26, and a wireless transmitter 32. The embedded microprocessor 26 may be programmed for data collection 28. A periodicity sensor, or sensors, 24 may be positioned at any appropriate location of locations on the drum 2. For example, a periodicity sensor(s) 24 may be positioned within monitoring unit 5. In an example configuration, the gyroscope, or gyroscopes, 22 and the periodicity sensor(s) 24 may be incorporated into a common circuit.

The gyroscope 22 may provide an output signal corresponding to the angular velocity of the rotating mixing drum 2 and the periodicity sensor 24 may provide an output signal corresponding to the period of rotation of the mixing drum 2. The embedded microprocessor 26 may be configured to receive the output signal from the gyroscope 22 and to receive the output signal from the periodicity sensor 24 and process the output signals for transmission as received data. In a further exemplary configuration, there may be more than one periodicity sensor 24. The embedded microprocessor 26 may send the received data to an external embedded processor 6 (such as the processor that monitors the energy or hydraulic pressure required to rotate the mixing drum and to control the rotational speed of the drum), or to a processor that may not be located on the mixing truck. In an aspect, the data is sent by a wireless transmitter 32 which is coupled to the sensor unit 20 and transmits the data to a wireless receiver 34 in communication with an embedded microprocessor 6 that monitors and controls the energy for rotating the mixing drum. The embedded microprocessor 6 comprises logic, such as an algorithm 30, for calibration of the gyroscope 22 based on the received data. The embedded processor 6 provides an output signal corresponding to the rotational rate of the drum 2 and provides calibration information 38 based on the output signals from the gyroscope 22 and the periodicity sensor 24.

In another configuration, the wireless sensor unit 20, comprising the gyroscope 22 is located on a rotating vessel which contains a displaceable material. During operation, the rotating vessel rotates about an axis. The rotating vessel could be a rotating wheel, (clothes) dryer, (clothes) washer, or other rotating object which contains a displaceable material, such as, for example, concrete, cement mortar, fabric or clothes, food or food components, pharmaceuticals, and fluid materials (such as pastes, slurries, or particles and suspensions, gases or other flowable materials). The wireless sensor unit 20 provides an angular velocity to a processor 6 which calibrates the rotational speed.

As another example, a wireless sensor unit 20 can be placed in the wheels/tires of a transportation vehicle to transmit data about each wheel/tire combination to an embedded microprocessor in the vehicle or at a remote location.

In further exemplary configurations, a temperature sensing device or other calorimetric device could also be included in the wireless sensor unit 20, which would be useful for the wheels/tires situation as well as for concrete mixing drums (as it is helpful to know the temperature of the concrete mix contained in the drum).

Referring to FIG. 2B, a schematic depiction of another configuration of a gyroscopic rotational monitoring unit is shown. In this particular configuration, the rotational monitoring unit is also a wireless sensor unit 20. The wireless sensor unit 20 comprises a gyroscope 22, a periodicity sensor 24, an embedded microprocessor 26, and a wireless transmitter 32. The embedded microprocessor 26 comprises a function for data collection 28 as well as an algorithm 30 for calibration.

In this configuration, the gyroscope 22 may provide an output signal corresponding to the angular velocity of the rotating mixing drum 2 and the periodicity sensor 24 provides an output signal corresponding to the period of rotation of the mixing drum 2. The embedded microprocessor 28 is configured to receive the output signal from the gyroscope 22 and to receive the output signal from the periodicity sensor 24. The embedded microprocessor 26 comprises an algorithm 30 for calibration. The embedded processor 26 provides an output signal corresponding to the rotational rate of the drum 2 and provides calibration information 38 based on the output signals from the gyroscope 22 and the periodicity sensor 24. The embedded microprocessor 26 sends the received data to an external embedded microprocessor 6, the external embedded processor 6 may or may not be located on the mixing drum 2 or non-rotating portion of the mount or platform for the mixing drum. The received data is sent by a wireless transmitter 32 transmitting the data to a wireless receiver 34.

It will be understood that the wireless sensor unit (20) configurations diagramed in FIGS. 2A and 2B will further comprise self-contained power supplies, such as batteries or battery packs, for powering the operation of the microprocessor 26, gyroscope 22, accelerometer 24 (or other periodicity sensor used within the unit), and other components. In further exemplary configurations, a motion detection device or system connected to a motion switch can be used to shut off power to conserve energy of the batteries or power pack in the wireless sensor unit 20. For example, the embedded processor 6 which monitors energy for turning the mixing drum 2 can sense that absence of motion and send a signal to a switch or the other microprocessor 26 to shut down the gyroscope 22 and accelerometer 24 and other components, so as to prolong battery life; and upon detecting pressure, the processor 6 can be programmed to send a signal to the switch or the other processor 26 in the wireless (gyroscope-containing) wireless sensor unit 20 to resume the flow of power to the gyroscope and other components as needed.

A "gyroscope", as used herein, refers to a device for measuring movement about a rotational axis and for generating other useful information. Different types of gyroscopes include (non-exhaustive) solid-state gyroscopes, Micro-Electro Mechanical System (MEMS) gyroscopes, laser gyroscopes, and fiber optic gyroscopes. Traditionally, gyroscopes have been used to provide stability or maintain a reference direction in navigation systems. These systems tend to operate in the 0 to 360 degree range. Gyroscopes have a tendency to drift based on physical properties, such as mass, inertia, and friction, as well as environmental factors such as temperature. When a gyroscope drifts, an offset is created between the actual movement about a rotational axis and the measured movement. Periodic calibration of the gyroscope can correct for such drift. Any gyroscope may be utilized in configurations.

The term "periodicity sensor" as used herein refers to an electrical or electronic sensor device that detects, senses, or otherwise monitors the rotation angle of a rotatable vessel or container. The periodicity sensor is used to provide information from which the rotational position of the rotatable vessel can be calculated and utilized to determine the period of rotation. The period of rotation is defined as being the time required for one complete revolution of the rotatable vessel.

In an aspect, the periodicity sensor 24 can be an accelerometer. The accelerometer may be a one-axis, two-axis, or three-axis accelerometer, which measures the acceleration of a rotatable vessel. The accelerometer is operably connected to the rotatable vessel, and may be mounted on the outside of a rotating vessel and used to measure the acceleration at the location where it is mounted. For a continuously rotating vessel, the accelerometer will provide a repetitive oscillation as the mounted accelerometer moves around the rotational axis of the vessel or mixing drum 2. As further discussed below, other forms of periodicity sensors may be utilized, including sensors that are not mounted to the rotating vessel.

Figure 3A:
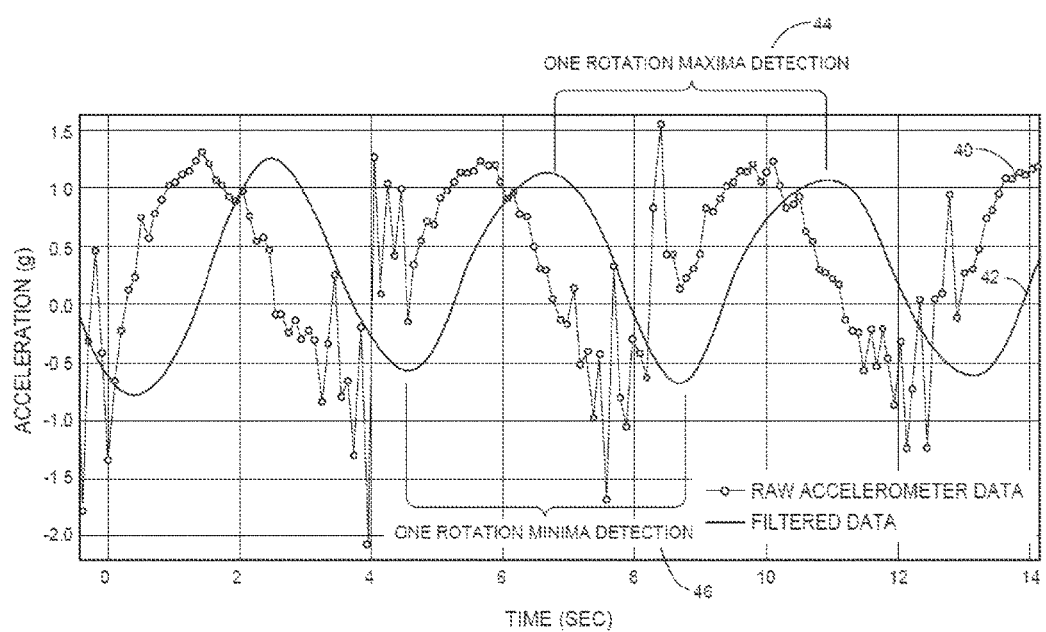
FIG. 3A is a graph illustrating example data from an accelerometer that is mounted onto a rotating vessel.

Referring to FIG. 3A, the graph illustrates data from an accelerometer that is mounted onto a rotating vessel (e.g., mixing drum). Each individual point (square) 40 plotted illustrates data measured by the accelerometer while the vessel rotates. The solid line 42 illustrates a smooth signal created by low pass filtering of the individual points. The distance from peak to peak of solid line 42 is one rotation, as illustrated by the maximum peaks at 44. The distance from the valley to valley of solid line 42 is one rotation, as illustrated by the minimum valleys at 46. The detected rotation maxima 44 and rotation minima 46 are inherent properties of the rotating vessel and provide information regarding the periodicity of the vessel. A relatively smooth line 42 with consistent rotation maximums or minimums would indicate that the rotating vessel is operating at a stable rate.

In still a further aspect of this disclosure, the gyroscope and an accelerometer are both coupled to a processor and a transmitter to form a rotational monitoring unit, as diagrammatically illustrated above. This rotational monitoring unit 5 can be housed in a protective housing unit that can be mounted onto a rotatable vessel, such as mixing drum 2. This rotational monitoring unit can also be mounted on other rotatable vessels including a washer or dryer drum, or other rotating vessels.

In a still further exemplary configuration, the gyroscope and a periodicity sensor may both be coupled to a processor and a transmitter as shown in FIG. 2B, but only the gyroscope is mounted onto the rotatable vessel, while the periodicity sensor is not mounted onto the rotating vessel. In this configuration, the periodicity sensor may be located elsewhere on the vehicle or device operating the rotatable vessel, as further described below. However, the periodicity sensor is still operably connected to the rotating vessel via a wireless transmitter or similar means of communication, in order to measure the period of rotation.

Figure 3B:
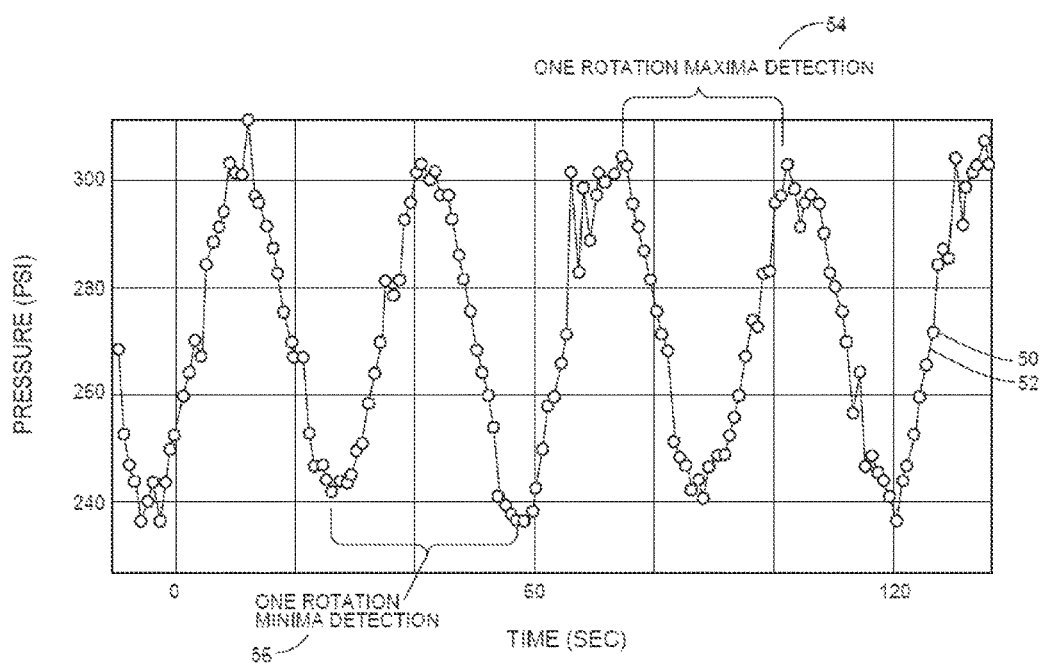
FIG. 3B is a graph illustrating example data from a hydraulic sensor measuring the torque of a motor driving a rotating vessel.

As noted above, the periodicity sensor need not be an accelerometer and need not be mounted onto the rotatable vessel, such as illustrated in FIG. 3B, in which the periodicity sensor can be a hydraulic pressure sensor. A hydraulic pressure sensor measures the amount of energy required to move the vessel by monitoring hydraulic fluid lines of the motor 3. The graph illustrates measured pressure data from a hydraulic sensor measuring the energy for driving a rotating vessel. The individual circles 50 represent data corresponding to energy as measured by the hydraulic pressure sensor and line 52 connects the individual data points 50. The distance from peak to peak of solid line 52 is one rotation maximum 54. The distance from the valley to valley of solid line 52 is one rotation minimum 56. The detected rotation maxima 54 and rotation minima 56 are inherent properties of the rotating vessel and provide information regarding the periodicity of the vessel. A relatively smooth line 52 with consistent rotation maximums or minimums would indicate that the rotating vessel is operating at a stable rate.

In still further exemplary configurations of the present disclosure, the rotational rate measured by the gyroscope may be calibrated by subjecting the output signals generated by the periodicity sensor (e.g., accelerometer) to a low pass filter, such as a Butterworth, 5th order low-pass with a relative cut-off frequency of 0.1*Nyquist. The minimum and maximum values of the filtered data are obtained, and from these values, the rotational rate or speed may be determined. In an aspect, the measured speed of the drum should be stable before the system begins to calibrate the gyroscope. The measured rotational speed, for example, may be unstable when a mixing drum is mounted onto a moving truck and affected or influenced by the various movements of the truck, e.g., stopping, turning, driving up or down ramps or over potholes, bumps, etc. To determine the stability of either a periodicity sensor or gyroscope, a Median Absolute Deviation (MAD) is used over a window of previous measurements. If the MAD over the window is less than a predetermined threshold value, then the output signals are considered stable. When the output signals are considered stable, a calibration constant may be computed by taking the median values of the output signals over the measurement windows to obtain linear averages of the two signals; one linear average is divided by the other to obtain the calibration constant. The calibration constant is then applied to the gyroscope output signal to calibrate the signal to better represent the actual rotation. In an aspect, calibration constants may be determined while the drum is rotating at different speeds. This ensures the best understanding of how the devices perform in particular circumstances.

Different calibration methods could be used depending on the requirements of the particular devices used. For concrete mixer drum applications, where typical rotation speeds are 1-20 revolutions per minute (RPM), an exemplary mode or method of calibration would involve the aforementioned linear-to-linear calibration.

In other configurations, a gyroscope or accelerometer which does not have linear response, the calibration could require an adaptive procedure involving multiple samples taken across the operational range of vessel rotation speed for the devices in actual application.

Figure 4A:
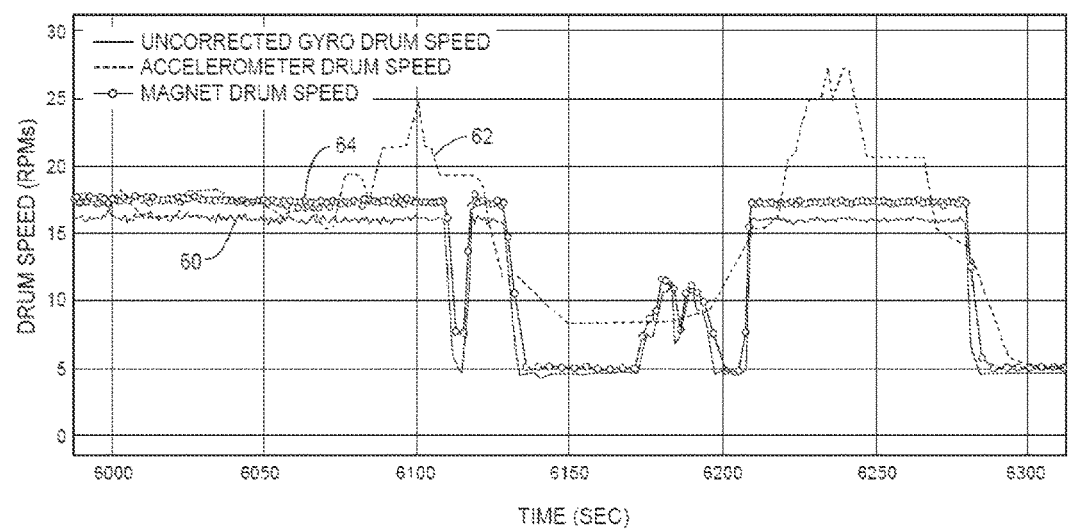
FIG. 4A is an example graphic depiction of drum speed including uncorrected gyroscope speed, accelerometer speed, and magnet speed.

Referring to FIG. 4A, a graphic depiction of drum speed of a rotating mixing drum according to a number of different measuring devices is illustrated. The units for drum speed are revolutions per minute (RPM). The graph shows three sets of data all measured over the period of approximately 300 seconds (6000 seconds to 6300 seconds). Line 64 illustrates drum speed measurements using magnetic sensors mounted to the drum. Line 62 illustrates drum speed measurements for an accelerometer mounted to the drum. Line 60 illustrates drum speed measurements for an uncalibrated gyroscope mounted to the drum. As illustrated by the graph, the lines 64 and 60 for the drum speeds measured by the magnetic sensors and the gyroscope are similar in shape, but often indicate different speeds, while the line 62 for the drum speed data as derived through the use of the accelerometer illustrates irregular behavior which may have been caused by changes in speed of the drum, movements of the truck carrying the drum, etc.

Figure 4B:
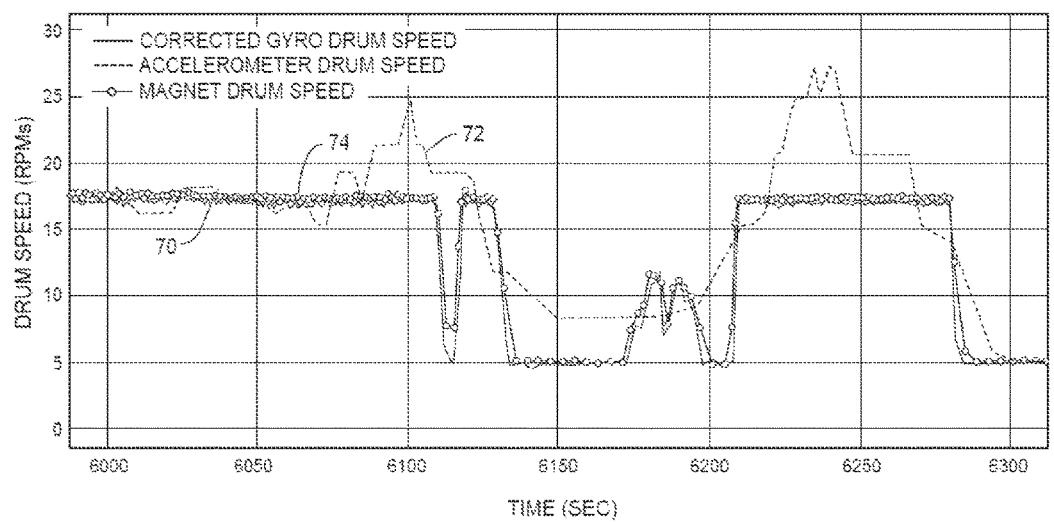
FIG. 4B is an example graphic depiction of drum speed including corrected gyroscope speed, accelerometer speed, and magnet speed.

FIG. 4B is similar to FIG. 4A, in that lines 74, 72, and 70 each illustrate drum speed measurements for magnetic sensors, an accelerometer, and a gyroscope, respectively, but unlike FIG. 4, the gyroscope drum speed measure 70 has been corrected based on periodicity data, as disclosed herein, and now rather precisely tracks the magnetic drum speed 74.

As illustrated in FIG. 1, in another configuration, a system and method utilize the calibrated rotational rate of the rotatable vessel for monitoring and/or controlling the slump (or other rheological property) of a concrete, mortar, or other hydratable cementitious mix contained in a rotatable concrete mixing drum 2, and is particularly suited for mixing drums on ready-mix concrete delivery trucks.

In configurations pertaining to the monitoring and/or control of concrete and other hydratable cementitious materials, the following definitions shall apply:

The term "cement" as used herein includes hydratable cement such as Portland cement which is produced by pulverizing clinker consisting of hydraulic calcium silicates, aluminates and aluminoferrites, and one or more forms of calcium sulfate (e.g., gypsum) as an interground additive. Typically, Portland cement is combined with one or more supplemental cementitious materials, such as fly ash, granulated blast furnace slag, limestone, natural pozzolans, or mixtures thereof, and provided as a blend. Thus, the term "cement" may also include supplemental cementitious materials which have been inter-ground with Portland cement during manufacture.

The term "cementitious" may be used herein to refer to materials that comprise Portland cement or which otherwise function as a binder to hold together fine aggregates (e.g., sand), coarse aggregates (e.g., crushed gravel), or mixtures thereof, in concrete and mortar.

The term "hydratable" as used herein refers to cement or cementitious materials that are hardened by chemical interaction with water. Portland cement clinker is a partially fused mass primarily composed of hydratable calcium silicates. The calcium silicates are essentially a mixture of tricalcium silicate ($3CaO.SiO_2$ or "C3S" in cement chemists' notation) and dicalcium silicate ($2CaO.SiO_2$, "C2S") in which the former is the dominant form, with lesser amounts of tricalcium aluminate ($3CaO.Al_2O_3$, "C3A") and tetracalcium aluminoferrite ($4CaO.Al_2O_3.Fe_2O_3$, "C4AF"). (See e.g., Dodson, Vance H., Concrete Admixtures (Van Nostrand Reinhold, New York, N.Y. 1990), page 1.).

The term "concrete" is used herein generally to refer to hydratable cementitious mixtures comprising cement, sand, and usually a coarse aggregate such as crushed stone or gravel, and optionally a chemical admixture such as one or more chemical admixtures (e.g., one or more PCEs).

A slump monitoring system comprises an energy sensor for monitoring the energy needed for rotating a concrete mixing drum for containing a hydratable cementitious mix, such as concrete, and a rotational measuring device mounted on the concrete mixing drum for measuring the rotational speed of the drum.

Figure 5:
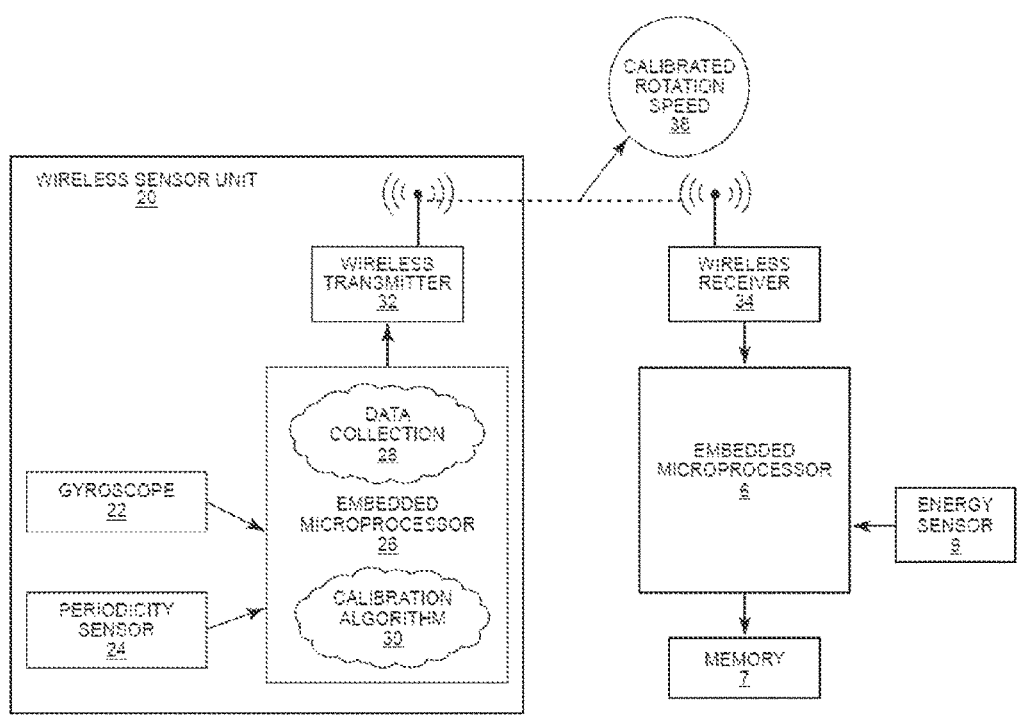
FIG. 5 is a schematic depiction of an exemplary slump monitoring system.

Referring to FIG. 5, an example schematic depiction of a slump monitoring system operating in conjunction with a rotational measuring system is illustrated. In this particular configuration, the rotational measuring device is a wireless sensor unit 20 which comprises a gyroscope 22, a periodicity sensor 24, an embedded processor 26, and a wireless transmitter 32. The embedded microprocessor 26 comprises a function for data collection 28 as well as an algorithm 30 for calibration. In an configuration, the algorithm 30 for calibration may be located within another processor external to the wireless sensor unit 20. The slump monitoring system further comprises a wireless receiver 34, an external embedded processor 6, and an energy sensor 9. The external embedded processor 6 may or may not be located on the concrete mixing drum 2.

In this configuration, the wireless sensor unit 20 is configured to be operably connected to a rotatable vessel, such as a concrete mixing drum. The gyroscope 22 provides an output signal corresponding to the angular velocity of the rotating concrete mixing drum 2 and the periodicity sensor 24 provides an output signal which is used by the microprocessor 26 for calculating the period of rotation of the concrete mixing drum 2. The embedded microprocessor 26 is configured to receive the output signal from the gyroscope 22 and to receive the output signal from the periodicity sensor 24. The embedded microprocessor 26 is programmed to apply an algorithm 30 for calibration. The embedded processor 26 provides an output signal corresponding to the rotational rate of the concrete drum 2 and provides calibration information 38 based on the output signals from the gyroscope 22 and the periodicity sensor 24. The embedded microprocessor 26 may or may not be located on the same platform or structure on which the rotatable drum is mounted. The output signal from the embedded microprocessor 26 is sent by a wireless transmitter 32 transmitting the data to a wireless receiver 34.

The energy sensor 9 can be operably connected to a motor or hydraulic pressure drive 3. The energy sensor 9 may also be mounted onto the motor 3. The wireless sensor unit 20 can be operably connected to a concrete mixing drum. In an configuration, the wireless sensor unit 20 is mounted onto the concrete mixing drum.

The gyroscope rotational measuring device 5 can be sold and used as part of an automated concrete slump monitoring system for monitoring and adjusting concrete slump. Such automated slump monitoring systems which are contemplated for use with or as part of the present disclosure are commercially available from Verifi LLC, 9466 Meridian Way, West Chester, Ohio USA.

If the microprocessor 6 is programmed to monitor and to adjust slump or other properties, it may be coupled and/or wirelessly connected to an accessible memory unit or units, either onboard the truck or located at a remote location. The memory units may contain data for correlating admixture amounts to slump effects or other properties of the concrete (slump shall be used as a shorthand example herein), whereby current slump can be adjusted to or towards a target slump.

In further exemplary configurations, gyroscope-containing wireless sensor unit 20, as illustrated in FIG. 2A, may contain an embedded processor, which, in addition to being programmed to calculate rotational speed of the drum, may be programmed to determine the number of mixing drum revolutions occurring in a period of time, the direction of the drum rotation, or both. In still further configurations, the processor 26 may be programmed to control and monitor the energy required by the motor or hydraulic drive unit to rotate the mixing drum (or a separate processor can be contained in the wireless sensor unit 20 for this purpose). A processor located in the wireless sensor unit 20 may be used to receive (wirelessly) signals from the motor or hydraulic pressure drive (shown at 3 in FIG. 1), and may be used to control the speed of the motor/drive (shown at 3 in FIG. 1).

Figure 6:
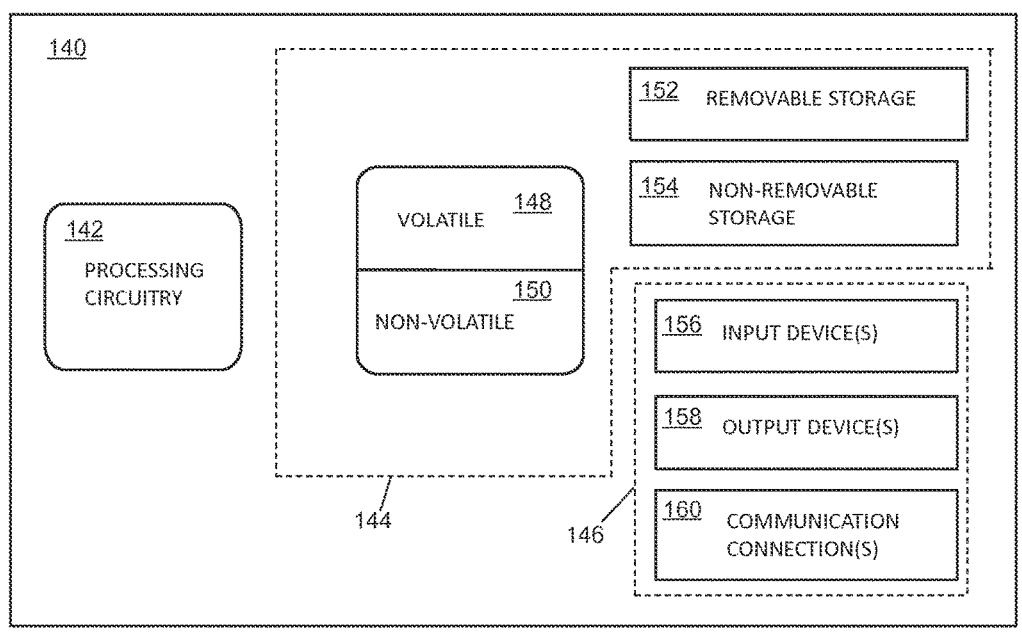
FIG. 6 is a block diagram of an example apparatus that me by utilized to facilitate gyroscopic rotation.

FIG. 6 is a block diagram of an example apparatus that may be utilized to facilitate a determination of gyroscopic rotation as described herein. The apparatus 140 may comprise hardware or a combination of hardware and software. In an example configuration, the functionality to facilitate a determination of gyroscopic rotation, as described herein, may reside in any one or combination of apparatuses. The apparatus 140 depicted in FIG. 6 may represent and perform functionality of any appropriate apparatus, or combination of apparatuses, such as, for example, embedded microprocessors 6 and 26 and memory 7, depicted in FIGS. 2A and 2B, or the like, or any appropriate combination thereof. It is emphasized that the block diagram depicted in FIG. 6 is exemplary and not intended to imply a specific implementation or configuration. Thus, the apparatus 140 may be implemented in a single device or multiple devices (e.g., single processor or multiple processors, single server or multiple servers, single controller or multiple controllers, etc.). Multiple apparatuses may be distributed or centrally located. Multiple apparatuses may communicate wirelessly, via hard wire, or any appropriate combination thereof.

In an example configuration, the apparatus 140 may comprise a processor and memory coupled to the processor. The memory may comprise executable instructions that when executed by the processor cause the processor to effectuate operations associated determining gyroscopic rotation, as described herein. As evident from the herein description, the apparatus 140 is not to be construed as software per se.

In an example configuration, the apparatus 140 may comprise a processing portion 142, a memory portion 144, and an input/output portion 146. The processing portion 142, memory portion 144, and input/output portion 146 may be coupled together (coupling not shown in FIG. 6) to allow communications therebetween. Each portion of the apparatus 140 may comprise circuitry for performing functions associated with each respective portion. Thus, each portion may comprise hardware, or a combination of hardware and software. Accordingly, each portion of the apparatus 140 is not to be construed as software per se. The input/output portion 146 may be capable of receiving and/or providing information from/to a communications device and/or other apparatuses configured for determining gyroscopic rotation, as described herein. For example, the input/output portion 146 may include a wireless communications (e.g., 2.5G/3G/4G/5G/GPS) card. The input/output portion 146 may be capable of receiving and/or sending video information, audio information, control information, image information, data, or any combination thereof. In an example configuration, the input/output portion 146 may be capable of receiving and/or sending information to determine a location of the apparatus 140 and/or the communications apparatus 140. In an example configuration, the input\output portion 146 may comprise a GPS receiver. In an example configuration, the apparatus 140 may determine its own geographical location and/or the geographical location of a communications device through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output portion 146 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or a combination thereof. In an example configuration, the input/output portion may comprise a WIFI finder, a two way GPS chipset or equivalent, or the like, or a combination thereof.

The processing portion 142 may be capable of performing functions associated with facilitating a determination of gyroscopic rotation, as described herein. For example, the processing portion 142 may be capable of, in conjunction with any other portion of the apparatus 140, installing an application for determining gyroscopic rotation, as described herein.

In a basic configuration, the apparatus 140 may include at least one memory portion 144. The memory portion 144 may comprise a storage medium having a concrete, tangible, physical structure. As is known, a signal does not have a concrete, tangible, physical structure. The memory portion 144, as well as any computer-readable storage medium described herein, is not to be construed as a signal. The memory portion 144, as well as any computer-readable storage medium described herein, is not to be construed as a transient signal. The memory portion 144, as well as any computer-readable storage medium described herein, is not to be construed as a propagating signal. The memory portion 144, as well as any computer-readable storage medium described herein, is to be construed as an article of manufacture having a concrete, tangible, physical structure.

The memory portion 144 may store any information utilized in conjunction with a determination of gyroscopic rotation, as described herein. Depending upon the exact configuration and type of processor, the memory portion 144 may be volatile 148 (such as some types of RAM), non-volatile 150 (such as ROM, flash memory, etc.), or a combination thereof. The apparatus 140 may include additional storage (e.g., removable storage 152 and/or non-removable storage 154) including, for example, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or any other medium which can be used to store information and which can be accessed by the apparatus 140.

The apparatus 140 also may contain communications connection(s) 160 that allow the apparatus 140 to communicate with other devices, apparatuses, or the like. A communications connection(s) may comprise communication media. Communication media typically embody computer readable instructions, data structures, program modules or other data in a modulated data signal such as a carrier wave or other transport mechanism and includes any information delivery media. By way of example, and not limitation, communication media may include wired media such as a wired network or direct-wired connection, and wireless media such as acoustic, RF, infrared, and other wireless media. The term computer readable media as used herein includes both storage media and communication media. The apparatus 140 also may include input device(s) 156 such as keyboard, mouse, pen, voice input device, touch input device, etc. Output device(s) 158 such as a display, speakers, printer, etc. also may be included.

Figure 7:
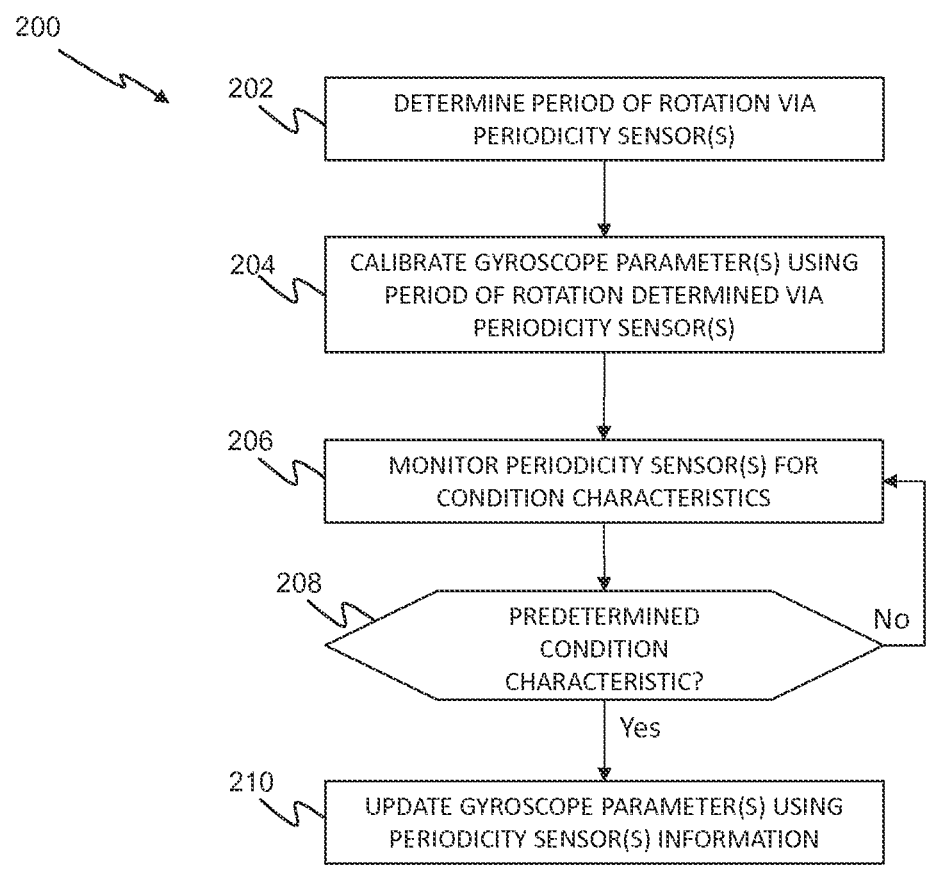
FIG. 7 shows a flow diagram of an example process for facilitating a determination of gyroscopic rotation.

FIG. 7 illustrates a flow diagram of an example process 200 for facilitating a determination of gyroscopic rotation, as described herein. At step 202, a first rate of rotation may be determined via the periodicity sensor(s) 24. In an example configuration, the first rate of rotation may be accomplished when a vehicle comprising the mixing system 1 is stationary, when a vehicle comprising the mixing system 1 is moving slowly, when variations of signals provided by the periodicity sensor(s) 24 are less than a predetermined value(s), or the like, or any appropriate combination thereof. For example, if sensor values for the periodicity sensor(s) are consistent within a range (e.g., plus/minus 5%), the initial rate of rotation may be determined. At step 204, the determined first rate of rotation may be used to calibrate a gyroscope parameter. Measurement of calibrated rotation may incorporate a scaling factor on the gyroscope rotation rate angle and a constant offset value. For example, an equation such as, Y=mX+b, may be utilized, wherein Y represents the calibrated measure of rotation (e.g., rotation rate angle), m represents a scaling factor based on values obtained via the periodicity sensor(s), X represents a measure of rotation obtained from the gyroscope prior to calibration, and b represents any appropriate constant. Different calibration methods may be used depending on the type of periodicity sensor being used, the position of the gyroscope, the type of system being monitored, or other factors that may introduce uncertainty to calibration. After calibration, at step 206, the periodicity sensor(s) 24 may be monitored for a condition characteristic. In an configuration, the condition characteristic may be a function of the stability of the mixing system 1 being monitored. When the stability meets a predetermined condition, then at step 210, the gyroscope parameter(s) may be updated. If the predetermined condition is not met, then the periodicity sensor(s) 24 may continue to be monitored. For example, if the system 1 is moving around such that readings from the periodicity sensor(s) 24 fluctuate at a certain rate above the predetermined condition, then the system 1 may not be stable and the gyroscope parameter is not updated. The periodicity sensor 24 continues to be monitored. If the readings from the periodicity sensor 24 have a fluctuation rate below the predetermined condition, this may indicate the system 1 is stable, and the gyroscope parameter may be updated with information from the periodicity sensor 24.

An advantage of using a rotational monitoring system as described herein is that a more accurate determination can be made for a rate of rotation of a continuously rotating vessel. Additionally, the rotational speed may be monitored numerous times within a single rotation of the vessel. Determining accurate rotational speeds may be applicable for applications such as, but not limited to, determining slump in a concrete mixing vessel.

Another advantage includes reducing error in determining the rate of rotation by mitigating noise or other disturbances effecting the rotating vessel. For example, while a wireless accelerometer mounted on the rotating vessel may be sufficient for speed measurement when the vessel is rotating and stationary, or otherwise not moving in a vertical or horizontal direction, large errors can be introduced when the vessel is in motion. Inaccuracies can be introduced, for example, by external forces or motion of the vessel other than rotation. Further, using a gyroscope to measure rotational rate may be sufficient over a certain period of time; however, as is known in the art, gyroscopes tend to have a bias drift. The bias drift may impact rate of rotation information provided by the gyroscope. Therefore, the use of both a gyroscope and a periodicity sensor may overcome or prevent these issues and provide a more accurate rate of rotation by using information provided by each device.

While the disclosure is described herein using a limited number of configurations, these specific configurations are not intended to limit the scope of the disclosure as otherwise described and claimed herein. Modification and variations from the described configurations exist. More specifically, the following examples are given as a specific illustration of configurations of the claimed disclosure.

What is claimed:

1. A system comprising:
   a gyroscope coupled to a rotatable concrete mixer drum having spirally-mounted mixer blades and an axis of rotation, the gyroscope for providing a first signal corresponding to a rate of rotation of the mixer drum;
   a periodicity sensor coupled to the rotatable concrete mixer drum, the periodicity sensor for providing a second signal corresponding to a period of rotation of the concrete mixer drum;
   a processor; and
   memory coupled to the processor, the memory comprising executable instructions that when executed by the processor cause the processor to effectuate operation of the concrete mixer drum having the spirally-mounted mixer blades, whereby rotation of the mixer drum in a first direction causes the contents of the drum to be mixed, and whereby rotation of the mixer drum in a second direction opposite the first direction causes the contents of the drum to be expelled from the drum, the instructions executable by the processor comprising:
   receiving the first signal;
   receiving the second signal;
   determining calibration information based on the received first signal and the received second signal; and
   generating an output signal corresponding to a calibrated rate of a rotation of the concrete mixer drum based on the calibration information.

2. The system of claim 1, wherein the gyroscope comprises a Micro-Electro Mechanical System (MEMS).

3. The system of claim 1, wherein the rate of rotation is an angular velocity of the rotatable concrete mixer drum.

4. The system of claim 1, wherein the gyroscope, the periodicity sensor, and the processor are located within a common housing enclosure mounted onto the rotatable concrete mixer drum.

5. The system of claim 4, wherein the gyroscope is mounted on the concrete mixer drum at a distance from the rotational axis of the concrete mixer drum.

6. The system of claim 5, wherein the accelerometer is mounted on the concrete mixer drum at a distance from the rotational axis of the concrete mixer drum.

7. The system of claim 1, wherein the periodicity sensor comprises an accelerometer.

8. The system of claim 1, wherein the at least one periodicity sensor comprises a hydraulic pressure sensor.

9. The system of claim 1, wherein the instructions executable by the processor further comprise:
   transmitting an indication of the calibrated rate of rotation of the concrete mixer drum.

10. The system of claim 1, wherein the instructions executable by the processor further comprise:
    determining whether the second signal is stable, wherein when the second signal is stable the gyroscope is calibrated.

11. The system of claim 1, further comprising a concrete slump monitoring system, the slump monitoring system comprising:
    a second processor, the second processor configured to receive the output signal corresponding to the calibrated rotational rate provided by the processor; and
    an energy sensor operably connected to the second processor, the energy sensor for measuring the energy required to rotate the rotatable mixer drum.

12. The system of claim 1, wherein the rotatable concrete mixer drum is mounted onto a truck.

13. The system of claim 1, wherein the gyroscope is configured to provide the first signal to the processor numerous times within a single rotation of the concrete mixer drum.

14. The system of claim 1, wherein the instructions executable by the processor further comprise:
    determining a calibration constant, to determine stability of either the gyroscope or periodicity sensor, while the drum is rotating at different speeds.

15. The system of claim 1, wherein the axis of rotation is between 10 and 20 degrees with respect to ground.

16. A system comprising:
- a gyroscope coupled to a rotatable mixer drum having spirally-mounted mixer blades and an axis of rotation, the gyroscope for providing a first signal corresponding to a rate of rotation of the mixer drum, the mixer drum being effective for mixing a displaceable material chosen from powders, particles, grains and seeds, cereals, coffee, detergents, pharmaceutical materials, and concrete;
- a periodicity sensor coupled to the rotatable mixer drum, the periodicity sensor for providing a second signal corresponding to a period of rotation of the mixer drum;
- a processor; and
- memory coupled to the processor, the memory comprising executable instructions that when executed by the processor cause the processor to effectuate operation of the mixer drum having the spirally-mounted mixer blades, whereby rotation of the mixer drum in a first direction causes the contents of the drum to be mixed, and whereby rotation of the mixer drum in a second direction opposite the first direction causes the contents of the drum to be expelled from the drum, the instructions executable by the processor comprising:
  - receiving the first signal;
  - receiving the second signal;
  - determining calibration information based on the received first signal and the received second signal; and
  - generating an output signal corresponding to a calibrated rate of a rotation of the mixer drum based on the calibration information.

17. The system of claim 16, wherein the particles are dry or in slurry, paste, or suspension.

* * * * *